United States Patent
Loehr et al.

(10) Patent No.: US 11,456,995 B2
(45) Date of Patent: Sep. 27, 2022

(54) METHOD AND DEVICE FOR OPERATING A COMMUNICATIONS NETWORK

(71) Applicant: Robert Bosch GmbH, Stuttgart (DE)

(72) Inventors: Hans Loehr, Nuremberg (DE); Harald Weiler, Goeppingen (DE); Marco Andreas Wagner, Leonberg (DE); Michael Ernst Doering, Hildesheim (DE); Rene Guillaume, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 390 days.

(21) Appl. No.: 16/709,399

(22) Filed: Dec. 10, 2019

(65) Prior Publication Data

US 2020/0195613 A1 Jun. 18, 2020

(30) Foreign Application Priority Data

Dec. 17, 2018 (DE) .................. 102018221952.4

(51) Int. Cl.
*H04L 9/40* (2022.01)

(52) U.S. Cl.
CPC ...... *H04L 63/0263* (2013.01); *H04L 63/1416* (2013.01); *H04L 63/1441* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 2016/0359903 A1* | 12/2016 | Lortz | G06F 15/177 |
| 2016/0366156 A1* | 12/2016 | Kantor | H04L 63/20 |
| 2017/0171245 A1* | 6/2017 | Lee | G06F 16/958 |
| 2017/0295188 A1* | 10/2017 | David | H04L 9/00 |
| 2019/0306180 A1* | 10/2019 | Dyakin | G06F 21/566 |
| 2020/0120119 A1* | 4/2020 | Kalra | H04L 63/1425 |
| 2020/0204460 A1* | 6/2020 | Schneider | H04L 43/10 |
| 2020/0389469 A1* | 12/2020 | Litichever | H04L 63/029 |

* cited by examiner

*Primary Examiner* — Joseph P Hirl
*Assistant Examiner* — Hassan Saadoun
(74) *Attorney, Agent, or Firm* — Norton Rose Fulbright US LLP; Gerard Messina

(57) ABSTRACT

A device and method for operating a communications network in a vehicle, or for operating an industrial communications network; a control entity for the communications network, in particular, a software-defined networking controller, determining a countermeasure after detection of an attack; an infrastructure component being configured as a function of the countermeasure, in particular, by setting at least one filtering, blocking or forwarding rule; and at least one data stream from or to at least one other infrastructure component being isolated by the infrastructure component, in a portion of the communications network; or at least one data stream to or from an end node being isolated by the infrastructure component, in a portion of the communications network.

22 Claims, 2 Drawing Sheets

METHOD AND DEVICE FOR OPERATING A COMMUNICATIONS NETWORK

RELATED APPLICATION INFORMATION

The present application claims priority to and the benefit of German patent application no. DE 10 2018 221 952.4, which was filed in Germany on Dec. 17, 2018, the disclosure of which is incorporated herein by reference.

FIELD OF THE INVENTION

The present invention relates to a method and device for operating a communications network.

BACKGROUND INFORMATION

Methods and devices for operating a communications network, in particular, in a vehicle, or for operating an industrial communications network, provide intrusion detection systems, by which attacks are detected. These are reported, so that experts may analyze the attacks and take appropriate countermeasures. To that end, components of the communications network are protected from the attacks, for example, by updating software.

With regard to that, it is desirable to improve the operation of communications networks.

SUMMARY OF THE INVENTION

This may be achieved by the subject matter of the descriptions herein.

A method for operating a communications network in a vehicle, or for operating an industrial communications network, provides that a control entity for the communications network, in particular, a software-defined networking controller, determine a countermeasure after detection of an attack; an infrastructure component being configured as a function of the countermeasure, in particular, by setting at least one filtering, blocking or forwarding rule; and at least one data stream from or to at least one other infrastructure component being isolated by the infrastructure component, in a portion of the communications network, in particular, by blocking, throttling or rerouting the at least one data stream; or at least one data stream to or from a terminal node being isolated by the infrastructure component, in a portion of the communications network, in particular, by blocking, throttling or rerouting the at least one data stream. The isolation may be implemented, for example, by blocking, throttling, or rerouting a data stream, or by other changes.

Terminal nodes include, for example, sensors or ECU's. Infrastructure components include, for example, switches of an Ethernet network or programmable network interfaces, in particular, forwarding devices of a controller area network. The communications network is, for example, an Ethernet network, a controller area network, or includes both networks. Networks, which operate in accordance with other communications protocols, may be provided, as well.

Forwarding rules unequivocally establish the forwarding of received data packets from input ports to particular output ports of a terminal node or of an infrastructure component. Filtering or blocking rules determine specified data, which are to be discarded, that is, not forwarded. Using the procedure described above, a dynamic reaction to a detected attack on terminal nodes or on the communications network is possible. This reaction includes the blocking of the communication of particular terminal nodes or subnetworks. Denial-of-service attacks may be responded to, e.g., by limiting bandwidth. The reaction may take place via reconfiguration of the data paths and forwarding rules. In TSN-based systems, for example, filters complying with IEEE802.1Qci are used for this. This initial reaction to attacks may occur directly in the vehicle or in an industrial plant. This means that software updates do not have to be carried out first. Ideally, in such an attack, other system or network domains are not affected and continue to function normally. For example, quality of service guarantees are kept. Thus, fail-safe operations are still possible in spite of denial of service attacks. In the case of a subsystem-wide or system-wide, software-defined networking architecture having suitable infrastructure components in each network domain, the reaction may take place in all relevant regions of the network, even if the computation for the detection of the attack and the reaction take place in a different subnetwork.

At least one data stream to or from the infrastructure component, or at least one data stream to or from the terminal node may be monitored, in particular, by an attack detection device, using a criterion regarding a quantity or a content of data of the data stream; an attack being detected, when the data stream deviates from the criterion. This constitutes a particularly effective interface to a conventional intrusion detection system.

A filtering, blocking or forwarding rule may be stored in the infrastructure component; the infrastructure component employing the stored filtering, blocking or forwarding rule for implementing the countermeasure. Preset rules are activated as a countermeasure. This allows the countermeasure to be implemented in a particularly effective manner.

In order to implement the countermeasure, it may be provided that a filtering, blocking or forwarding rule be received by the infrastructure component; the infrastructure component employing the received filtering, blocking or forwarding rule for implementing the countermeasure. This is a particularly flexible configuration approach. For example, this allows new rules to be implemented via a software update of the control entity.

As a countermeasure for an attack on a path between two devices of the communications network, it may be provided that a redundant path between the two devices be designated; the redundant path being configured, using filtering, blocking or forwarding rules; and the two devices being an infrastructure component and a terminal node, an infrastructure component and an infrastructure component, or a terminal node and a terminal node. The reaction may be that the data traffic is directed over the redundant path. Consequently, a manipulated node of the communications network or a manipulated network path may be prevented from receiving and/or forwarding sensitive data in an unauthorized manner, or a manipulated node may be decoupled from the rest of the network, if no node-specific component is available for such a measure.

It may be provided that the terminal node be a control unit or a sensor on a controller area network or an Ethernet network. This permits use in a communications network, which is often used in vehicles.

The terminal node may be a device of a controller area network; the infrastructure component being a forwarding device, which relays messages to or from the terminal node, out of or into the controller area network, according to stipulated rules, or processes them further. This constitutes an interface, for example, a programmable network interface, for an isolatable subnetwork.

It may be provided that the infrastructure component be a switch for software-defined networking or time-sensitive networking. This is an implementation in a network technology, which is often used in vehicles.

At least one terminal node is configured to discard specified data. Using configurable terminal nodes, devices connected in incoming circuit, such as programmable network interfaces or switches, are added or replaced.

A device, in particular, a control entity for operating a communications network in a vehicle, or for operating an industrial communications network, has a processor and a storage device including instructions, upon the execution of which by the processor the control entity determines a countermeasure after detection of an attack; an infrastructure component being configurable due to the countermeasure, as a function of the countermeasure, in particular, by setting at least one filtering, blocking or forwarding rule; and the countermeasure causing the infrastructure component to isolate at least one data stream from or to at least one other infrastructure component, in a portion of the communications network; or the countermeasure causing the infrastructure component to isolate at least one data stream to or from a terminal node, in a portion of the communications network. The control entity may be a central entity, in particular, a software-defined networking controller, which carries out the described countermeasure. The control entity may also be a distributed computer system.

To implement the countermeasure, the control entity may be configured to transmit a filtering, blocking or forwarding rule to the infrastructure component; the filtering, blocking or forwarding rule being able to be applied by the infrastructure component for carrying out the countermeasure, using the received filtering, blocking or forwarding rule. By updating the control entity, the functionality is easily adaptable to new attacks or a changed communications network.

An infrastructure component for operating a communications network in a vehicle, or for operating an industrial communications network, has a processor and a storage device including instructions, upon the execution of which by the processor a configuration for a countermeasure is receivable by a control entity for the communications network after detection of an attack; the infrastructure component being configured to be configured as a function of the countermeasure, in particular, by setting at least one filtering, blocking or forwarding rule; and the infrastructure component being configured to isolate at least one data stream from or to at least one other infrastructure component, in a portion of the communications network, in particular, by blocking, throttling or rerouting the at least one data stream; or the infrastructure component being configured to isolate at least one data stream to or from a terminal node, in a portion of the communications network, as a function of the countermeasure, in particular, by blocking, throttling or rerouting the at least one data stream. The parts of the communications network affected by an attack are isolated in this manner. The rest of the data traffic remains unchanged.

A filtering, blocking or forwarding rule may be stored in the infrastructure component; the infrastructure component being configured to apply the stored filtering, blocking or forwarding rule as a function of the received configuration, in order to carry out the countermeasure. Consequently, only information regarding the rule to be applied must be transmitted for the new configuration. This reduces the speed of response.

In order to implement the countermeasure, it may be provided that the infrastructure component be configured to receive a filtering, blocking or forwarding rule; the infrastructure component being configured to apply the received filtering, blocking or forwarding rule for implementing the countermeasure. The infrastructure component is, for example, a switch or a programmable network interface.

The terminal node may be a device of a controller area network; the infrastructure component being a forwarding device, which is configured to relay messages to or from the terminal node, out of or into the controller area network, according to stipulated rules, or to process them further. The forwarding device is used as a forwarding device for the terminal node in a controller area network.

It may be provided that the infrastructure component be a switch for software-defined networking or time-sensitive networking. This allows implementation in a type of network, which is often used.

Further advantageous refinements are derived from the following description and the drawings.

DETAILED DESCRIPTION

Figure 1:
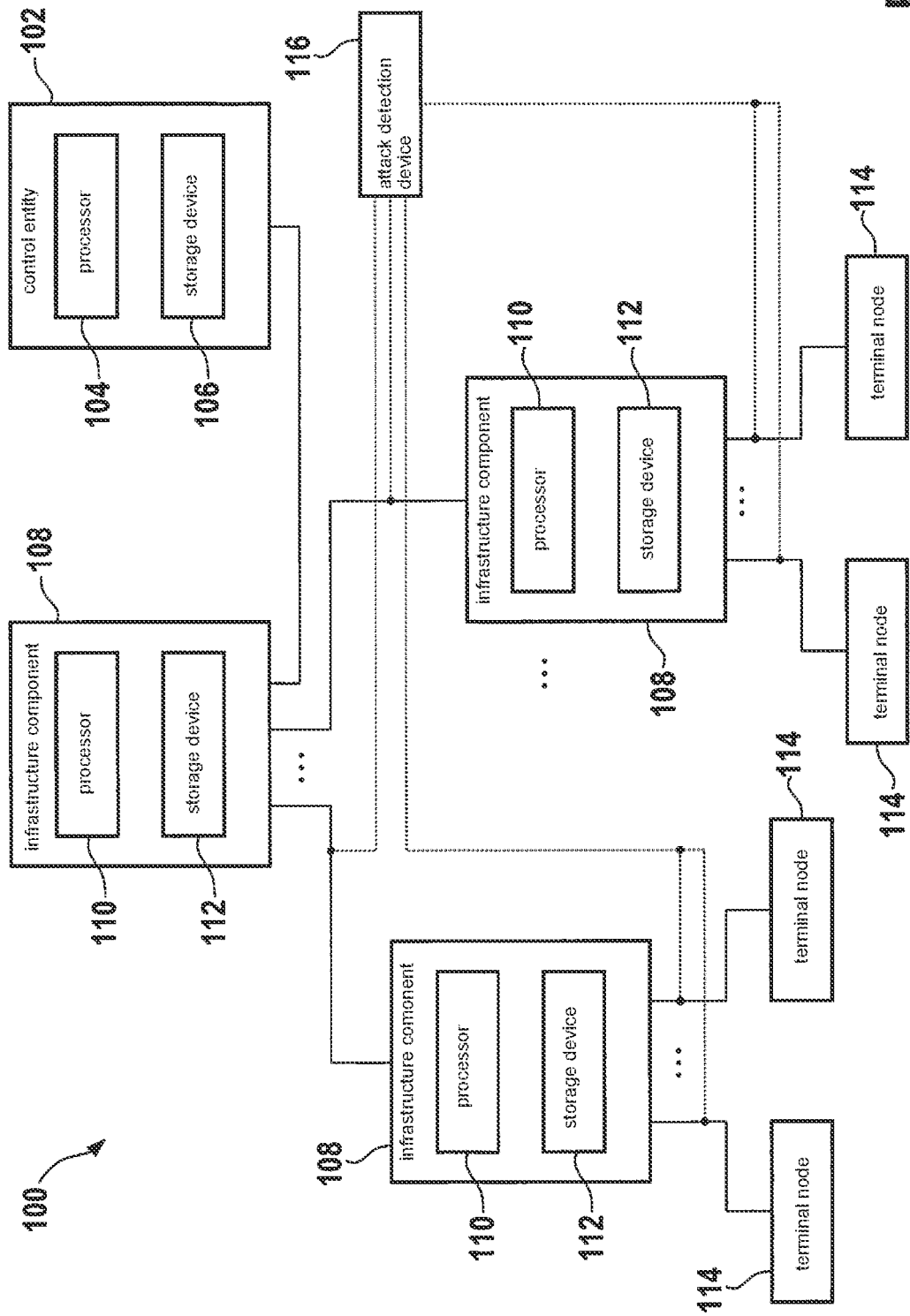
FIG. 1 shows a schematic representation of a communications network.

FIG. 1 shows a schematic representation of a communications network 100, for example, in a vehicle, or an industrial communications network 100.

Communications network 100 includes a control entity 102 for operating communications network 100. In the example, control entity 102 is a software-defined networking controller. Software-defined networking SDN is understood to be an approach for constructing computer network devices and software, in which two fundamental components of such devices are separated from each other and abstracted, the control plane and the data plane.

Control entity 102 may also be configured for time-sensitive networking, TSN. In the following, TSN denotes an implementation of mechanisms in a communications network, which relate to the following categories:

Time synchronization: All participating devices require a common understanding of the time.

Scheduling and traffic shaping: In the processing and forwarding of network packets, all of the participating devices operate in accordance with the same rules.

Selection of the communication paths, reservations and fault tolerance: During the selection and reservation of bandwidth and communication paths, all participating devices operate according to the same rules.

Control entity 102 has a processor 104 and a storage device 106 including instructions, upon the execution of which by processor 104 control entity 102 for communications network 100 determines a countermeasure after detection of an attack on communications network 100 or parts of it. This functionality supplements the functioning of control entity 102 for SDN and/or TSN.

Communications network 100 includes at least one infrastructure component 108. The at least one infrastructure component 108 receives and transmits messages in communications network 100 in compliance with rules, in particular, filtering, blocking or forwarding rules. Infrastructure component 108 includes a processor 110 and a storage device 112 having instructions, upon the execution of which by processor 110 a configuration for a countermeasure may be received by control entity 102.

Infrastructure component 108 is configured to be configured as a function of the countermeasure, in particular, by setting at least one filtering, blocking or forwarding rule. This functionality supplements the functioning of infrastructure component 108 for SDN and/or TSN.

Infrastructure component 108 is configured to isolate at least one data stream from or to at least one other infrastructure component 108, in a portion of communications network 100, as a function of the countermeasure. Alternatively or additionally, infrastructure component 108 is configured to isolate at least one data stream to or from a terminal node 114, in a portion of communications network 100, as a function of the countermeasure.

In the example, communications network 100 includes a plurality of infrastructure components 108 and a plurality of terminal nodes 114. In the example, these are hierarchically grouped by connecting one of infrastructure components 108 directly to two different infrastructure components 108. The two different infrastructure components 108 are each connected to a plurality of terminal nodes 114. In the example, terminal nodes 114 are only connected directly to one of infrastructure components 108. In the example, the direct connection is a wired connection. In the example, infrastructure components 108 are switches for software-defined networking and/or time-sensitive networking. In the example, terminal nodes 114 are sensors or control units or actuators. In FIG. 1, the direct connections are represented as solid lines.

A data stream to or from infrastructure component 108 or a data stream to or from a terminal node 114 is monitored, in particular, by an attack detection device 116. In the example, attack detection device 116 monitors the data stream, using a criterion with regard to a quantity or a content of data of the data stream. In the example, attack detection device 116 is configured to detect an attack, if the data stream deviates from the criterion. In FIG. 1, the communication paths for monitoring are represented as dashed lines. In the example, the communication takes place over communications network 100. The communication may also occur over separate communication lines.

Control entity is configured to transmit a filtering, blocking or forwarding rule to infrastructure component, in order to implement the countermeasure; the filtering, blocking or forwarding rule being able to be applied by infrastructure component for carrying out the countermeasure, using the received filtering, blocking or forwarding rule.

At least one filtering, blocking or forwarding rule may also be stored already in infrastructure component 108. In this case, infrastructure component 108 is configured to apply the stored filtering, blocking or forwarding rule for implementing the countermeasure. This means that the configuration is implemented by activating a first, stored filtering, blocking or forwarding rule. In addition, an active, stored filtering, blocking or forwarding rule may be deactivated.

In order to implement the countermeasure, infrastructure component 108 is configured to receive a filtering, blocking or forwarding rule. Infrastructure component 108 is configured to apply the received filtering, blocking or forwarding rule for implementing the countermeasure.

In the example, terminal node 114 is a device of a controller area network. Terminal node 114 is, for example, a control unit or a sensor on a controller area network. Devices from an Ethernet network may also be provided in place of devices in controller area networks.

In the example, infrastructure component 108 is a forwarding device, which is configured to relay messages to or from terminal node 114, out of or into the controller area network, according to stipulated rules, or to process them further. In the example, infrastructure component 108 is a programmable network interface or a switch for software-defined networking and/or time-sensitive networking. Infrastructure components from an Ethernet network may also be provided in place of such infrastructure components in controller area networks.

The described components are parts of an intrusion isolation system. Control entity 102 is, for example, a software-defined networking controller, which has an overall view of communications network 100, in particular, with regard to the topology of communications network 100, the characteristics of communication paths in it, the infrastructure components 108 and/or the state of the communication paths, for example, with regard to their capacity utilization. Control entity 102 may intervene in the configuration of infrastructure components 108. In the example of the software-defined networking controller, control entity 102 constitutes a logically centralized entity, but may be implemented in both a centralized and a distributed manner. Control entity 102 may equally be implemented as a subcomponent of a different network component.

In the example of a controller area network, infrastructure components 108 are connected in incoming circuit to each of terminal nodes 114 as programmable network interfaces. In the example, infrastructure components 108 are configured to forward and/or process messages further on the basis of set rules.

In a controller area network, gateways may be provided, which each constitute a programmable network interface for each controller area network interface.

Terminal nodes 114 are, for example, ECU's, sensors or actuators, which include application software and exchange messages over the controller area network.

In an Ethernet, infrastructure components 108 may also be switches, which are distributed in communications network 100 and forward and/or process messages further on the basis of set rules.

In this case, terminal nodes 114 are, for example, ECU's, sensors or actuators, which contain the application software and exchange messages over the Ethernet network defined by the switches.

In the example, a network configuration specified by control entity 102, in the example, by the software-defined networking controller, ensures that data traffic between ECU's receives a necessary quality of service characteristic. As described in the following, attacks are responded to by blocking and/or filtering. In the case of a DoS attack, it is responded to, for example, by limiting bandwidth. In the example, this reaction takes place locally via the nearest infrastructure components 108 and is coordinated by control entity 102, in the example, by the software-defined networking controller.

The reactions do not have to be carried out exclusively by infrastructure components 108, such as programmable network interfaces or switches, but may also be carried out by separate components, such as filter or conversion components.

For systems based on time-sensitive networking, filters complying with IEEE802.1Qci may also be used.

The procedure described in the following brings about isolation of a detected attack. In the example, a terminal node 114, in the example, an ECU, is attacked, e.g., by introducing a defective software component. Due to that, this affected ECU transmits additional or falsified data into communications network 100. In the example of a hierarchical construction of communications network 100, falsified data are transmitted into communications network 100, downstream from an infrastructure component 108, for example, downstream from a switch. As a result, a portion of communications network 100 and/or a subsystem of a vehicle, e.g., a driving function or a function of an industrial facility, may be impaired. In the example, this manipulation is detected, e.g., by a suitable intrusion detection system, which takes the form of an attack detection device 116.

Control entity 102 configures infrastructure component 108, for example, the switch, in a suitable manner, so that the data traffic from the attacked ECU is isolated from the rest of the network.

Variant 1: This is accomplished by blocking the data traffic completely from and/or to the affected ECU.

Variant 2: This is accomplished by filtering certain data streams from and/or to the affected ECU.

Alternatively or additionally, a rule, which is activated in response to detection of the attack and carries out the appropriate reaction, is already stored in infrastructure component 108, in the example, in the switch.

In the case of bandwidth limitation, one proceeds by recognizing that a majority of a bandwidth of a connection in communications network 100 is utilized by messages, which are transmitted by an affected terminal node 114, for example, due to a defective software component. Consequently, it is possible that no more data may be transmitted or received by other terminal nodes 114. The exceedance of a bandwidth allocated to affected terminal node 114 is detected by the intrusion detection system. As a countermeasure, in this example, infrastructure components 108 are configured in such a manner, that affected terminal node 114 may only utilize a reduced bandwidth of communications network 100.

Figure 2:
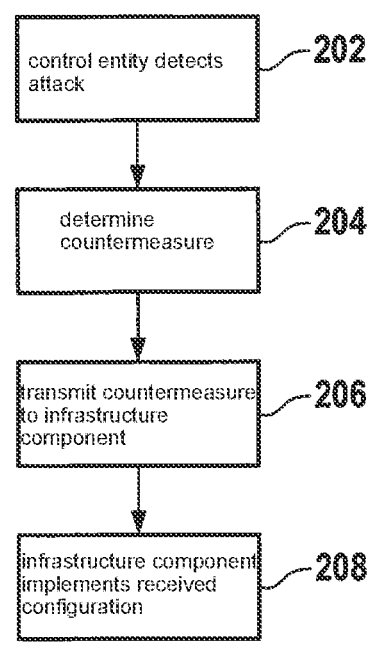
FIG. 2 shows a schematic representation of a method for operating the communications network.

A schematic representation of a method for operating communications network 100 in a vehicle is shown in FIG. 2. The method is also applicable in an industrial communications network.

In the method for operating communications network 100, it is provided that in a step 202, a control entity 102 for communications network 100 detect an attack. Control entity 102 is, in particular, the software-defined networking controller. In the example, at least one data stream to or from at least one of infrastructure components 108 or at least one data stream to or from at least one of terminal nodes 114 is monitored. The monitoring is accomplished, in particular, by attack detection device 116, using the criterion regarding an amount or the content of data of the data stream. In the example, an attack is detected, when the data stream deviates from the criterion. For example, a suitable intrusion detection system, IDS, is used.

In one aspect, terminal node 114 is a device of the controller area network, and infrastructure component 108 is a forwarding device, which relays messages to or from terminal node 114, out of or into the controller area network, according to stipulated rules, or processes them further.

As a criterion, in the example, it is checked if more data is transmitted into the network by a terminal node 114, than is provided for in the established rules. For example, it is checked if a bandwidth allocated to terminal node 114 in the established rules is being exceeded. Alternatively, or in addition, as a criterion, it is checked if the transmitted data contain implausible sensor values or control commands, that is, if the contents of the transmitted data are other than provided for in the established rules.

Subsequently, in a step 204, a countermeasure is determined after detection of the attack.

In a further aspect, at least one filtering, blocking or forwarding rule is stored in at least one of infrastructure components 108. This is applied, in order to implement the countermeasure. In this case, at least one of infrastructure components 108 and/or at least one filtering, blocking or forwarding rule is selected as a countermeasure.

In a second aspect, at least one filtering, blocking or forwarding rule is determined.

The level of the reaction, for example, limitation via the blocking of messages in the data stream, may vary, for example, as a function of a grouping of data traffic in safety classes. The filtering, blocking or forwarding rules necessary for this are determined, for example, as a function of the topology of communications network 100.

This is accomplished, for example, by blocking the data traffic from or to a terminal node 114 completely. Alternatively or additionally, this is accomplished by filtering certain data streams from or to a terminal node 114.

In the first aspect, the at least one filtering, blocking or forwarding rule is determined, for example, in advance, as described for the second aspect, and then stored in advance.

In a subsequent step 206, a configuration is transmitted to infrastructure component 108 for implementing the countermeasure. In the example, control entity 102 transmits, in the first aspect, an information item regarding which of the stored filtering, blocking or forwarding rules should be used, and which should not. In the second aspect, the filtering, blocking or forwarding rule is transmitted itself and received 206 by infrastructure component 108.

In a step 208, infrastructure component 108 implements the received configuration, that is, the at least one filtering, blocking or forwarding rule is applied for implementing the countermeasure.

For example, as a countermeasure for an attack on a path between two devices of communications network 100, a redundant path between the two devices is determined. The redundant path is configured, using filtering, blocking or forwarding rules.

The two devices may be infrastructure component 108 and terminal node 114. The two devices may both be infrastructure components 108, as well. The two devices may both be terminal nodes 114, as well.

At least one infrastructure component 108 is configured as a function of the countermeasure. In the first aspect, at least one infrastructure component 108 is implemented by setting at least one stored filtering, blocking or forwarding rule. In the second aspect, the received filtering, blocking or forwarding rule is applied. In the example, previously used filtering, blocking or forwarding rules, which relate to the same devices or data streams, are replaced or no longer used.

For example, at least one data stream from or to at least one other infrastructure component 108 is isolated by the at least one infrastructure component 108, in a portion of communications network 100. Additionally or alternatively, at least one data stream to or from a terminal node 114 is isolated in a portion of communications network 100, by the at least one infrastructure component 108. In addition, or as an alternative to that, at least one terminal node 114 is configured to discard specified data.

What is claimed is:

1. A method for operating a communications network in a vehicle, the method comprising:
determining, with a control entity for the communications network in the vehicle, a countermeasure after detecting an attack, the control entity being a software-defined networking (SDN) controller situated in the vehicle and connected to the communications network;

transmitting, by the control entity to an infrastructure component, a configuration for implementing the determined countermeasure, wherein the infrastructure component is a switch situated in the vehicle and connected to the communications network;

implementing, by the infrastructure component, as a function of the transmitted configuration, the determined countermeasure, by setting at least one filtering, blocking or forwarding rule; and performing, by the infrastructure component by applying the set at least one filtering, blocking, or forwarding rule, one of the following: (i) isolating at least one data stream from or to at least one other infrastructure component by the infrastructure component in a portion of the communications network; or (ii) isolating at least one data stream to or from a terminal node by the infrastructure component in a portion of the communications network.

2. The method of claim 1, wherein at least one data stream to or from the infrastructure component, or at least one data stream to or from the terminal node, is monitored, in particular, by an attack detection device, using a criterion regarding a quantity or a content of data of the data stream, and wherein an attack is detected when the data stream deviates from the criterion.

3. The method of claim 1, wherein a filtering, blocking or forwarding rule is stored in the infrastructure component, and wherein the infrastructure component applies the stored filtering, blocking or forwarding rule for implementing the countermeasure.

4. The method of claim 1, wherein to implement the countermeasure, a filtering, blocking or forwarding rule is received by the infrastructure component, and wherein the infrastructure component applies the received filtering, blocking or forwarding rule for implementing the countermeasure.

5. The method of claim 1, wherein as a countermeasure for an attack on a path between two devices of the communications network, a redundant path between the two devices is determined, wherein the redundant path is configured, using filtering, blocking or forwarding rules, and wherein the two devices includes one of: (a) an infrastructure component and a terminal node, (b) an infrastructure component and an infrastructure component, or (c) a terminal node and a terminal node.

6. The method of claim 1, wherein the terminal node includes a control unit or a sensor, and the communications network in the vehicle is a controller area network or an Ethernet network.

7. The method of claim 1, wherein the terminal node includes a device of a controller area network, and wherein the infrastructure component according to stipulated rules, relays messages to or from the terminal node, out of or into the controller area network, or processes them further.

8. The method of claim 1, wherein the switch is configured for software-defined networking or time-sensitive networking.

9. The method of claim 1, wherein at least one terminal node is configured to discard specified data.

10. An apparatus for operating a communications network in a vehicle, comprising:

a control entity for the communications network in the vehicle, the control entity being a software-defined networking (SDN) controller situated in the vehicle and being connected to the communication network, the control entity including a processor and a storage device, which includes instructions, which are executable by the processor, and configured to perform the following:

determining a countermeasure after detecting an attack;

transmitting, by the control entity to an infrastructure component, a configuration for implementing the determined countermeasure, wherein the infrastructure component is switch situated in the vehicle and connected to the communication network;

wherein the infrastructure component implements, as a function of the transmitted configuration, the determined countermeasure, by setting at least one filtering, blocking, or forwarding rule;

wherein the set at least one filtering, blocking, or forwarding rule causes the infrastructure component to one of: (i) isolate at least one data stream from or to at least one other infrastructure component, in a portion of the communications network; or (ii) isolate at least one data stream to or from a terminal node, in a portion of the communications network.

11. The control entity of claim 10, wherein the configuration transmitted by the control entity is the at least one filtering, blocking or forwarding rule to implement the countermeasure.

12. An infrastructure component for operating a communications network in a vehicle, or for operating an industrial communications network, comprising:

a switch situated in the vehicle and connected to the communications network in the vehicle, the switch a processor and a storage device, including instructions, which are executable by the processor to perform the following:

receiving, by the infrastructure component, a configuration for a countermeasure from a control entity for the communications network, after detecting an attack, the control entity being a software-defined network controller situated in the vehicle and connected to the communications network in the vehicle;

implementing, by the infrastructure component, the countermeasure, as a function of the received configuration, by implementing at least one filtering, blocking, or forwarding rules, so as to perform one of the following: (i) isolating at least one data stream from or to at least one other infrastructure component, in a portion of communications network, as a function of the countermeasure, or (ii) isolating at least one data stream to or from a terminal node, in a portion of communications network, as a function of the countermeasure.

13. The infrastructure component of claim 12, wherein a plurality of filtering, blocking, and forwarding rules are stored in the infrastructure component, and the received configuration including an item of information regarding which of the plurality of the stored filtering, blocking or forwarding rules should be used to implement the countermeasure.

14. The infrastructure component of claim 12, wherein the received configuration includes the filtering, blocking or forwarding rule for implementing the countermeasure.

15. The infrastructure component of claim 12, wherein the terminal node includes a device of a controller area network, and wherein the infrastructure component includes a forwarding device, which is configured, according to stipulated rules, to relay messages to or from the terminal node, out of or into the controller area network, or to process them further.

16. A non-transitory computer readable medium on which is stored a computer program, having program code for operating a communications network in a vehicle, the program code, when executed by a processor, causing the processor to perform the following:

determining, with a control entity for the communications network in the vehicle, a countermeasure after detecting an attack, the control entity being a software-defined networking (SDN) controller situated in the vehicle and connected to the communications network;

transmitting, by the control entity to an infrastructure component, a configuration for implementing the determined countermeasure, wherein the infrastructure component is a switch situated in the vehicle and connected to the communications network;

implementing, by the infrastructure component, as a function of the transmitted configuration, the determined countermeasure, by setting at least one filtering, blocking or forwarding rule; and performing, by the infrastructure component applying the set at least one filtering, blocking, for forwarding rule, one of the following: (i) isolating at least one data stream from or to at least one other infrastructure component by the infrastructure component in a portion of the communications network; or (ii) isolating at least one data stream to or from a terminal node by the infrastructure component in a portion of the communications network.

17. The computer readable medium of claim 16, wherein at least one data stream to or from the infrastructure component, or at least one data stream to or from the terminal node, is monitored, in particular, by an attack detection device, using a criterion regarding a quantity or a content of data of the data stream, and wherein an attack is detected when the data stream deviates from the criterion.

18. The method of claim 1, wherein the isolating is performed by blocking, throttling or rerouting the at least one data stream.

19. The apparatus of claim 10, wherein the isolating is performed by blocking, throttling or rerouting the at least one data stream.

20. The infrastructure component of claim 12, wherein the isolating is performed by blocking, throttling or rerouting the at least one data stream.

21. The method as recited in claim 1, wherein the configuration transmitted by the control entity includes the at least one filtering, blocking or forwarding rule.

22. The method as recited in claim 1, wherein the infrastructure component stores, in the infrastructure component, a plurality of filtering, blocking or forwarding rules, and wherein the configuration transmitted by the control entity includes an information item regarding which of the stored plurality of filtering, blocking or forwarding rules should be used to implement the determined countermeasure.

* * * * *